US008872131B2

(12) United States Patent
Rozenberg et al.

(10) Patent No.: US 8,872,131 B2
(45) Date of Patent: Oct. 28, 2014

(54) METHOD AND SYSTEM FOR TREATING LIQUIDS BY ULTRAVIOLET ILLUMINATION

(71) Applicant: Atlantium Technologies Ltd, Beit-Shemesh (IL)

(72) Inventors: Ytzhak Rozenberg, Ramat Gan (IL); Mike Kertser, Bnei Ayish (IL); Tovit Lichi, Gedera (IL); Zohar Vardiel, Or Yehuda (IL); Itay Kreisel, Shimshit (IL)

(73) Assignee: Atlantium Technologies Ltd., Beit-Shemesh (IL)

( * ) Notice: Subject to any disclaimer, the term of this patent is extended or adjusted under 35 U.S.C. 154(b) by 0 days.

(21) Appl. No.: 14/104,433

(22) Filed: Dec. 12, 2013

(65) Prior Publication Data

US 2014/0166897 A1 Jun. 19, 2014

Related U.S. Application Data

(60) Provisional application No. 61/736,860, filed on Dec. 13, 2012.

(51) Int. Cl.
| | |
|---|---|
| *C02F 1/32* | (2006.01) |
| *C02F 1/30* | (2006.01) |
| *G01N 21/00* | (2006.01) |
| *G01N 21/33* | (2006.01) |

(52) U.S. Cl.
CPC ........................... *C02F 1/325* (2013.01)
USPC .................. 250/455.11; 250/504 R; 250/372; 250/365; 422/24; 210/748.1; 210/748.01

(58) Field of Classification Search
CPC ........... A61L 2/10; A61L 2/0011; C02F 1/32; C02F 1/325; C02F 1/30; C02F 2201/3227; C02F 2201/3222; G21K 5/00

USPC .......... 250/455.11, 372, 365, 504 R; 422/24; 210/748.1, 748.01
See application file for complete search history.

(56) References Cited

U.S. PATENT DOCUMENTS

| | | | |
|---|---|---|---|
| 6,403,030 B1* | 6/2002 | Horton, III ............... | 210/748.11 |
| 6,447,720 B1* | 9/2002 | Horton et al. ............ | 210/748.11 |
| 7,683,344 B2* | 3/2010 | Tribelsky et al. ......... | 250/435 |
| 2009/0250626 A1* | 10/2009 | Schlesser et al. ........ | 250/455.11 |
| 2010/0296971 A1 | 11/2010 | Gaska et al. | |

FOREIGN PATENT DOCUMENTS

| | | |
|---|---|---|
| DE | 38 37 905 | 5/1990 |
| WO | WO 93/07091 | 4/1993 |
| WO | WO 01/64588 | 9/2001 |

* cited by examiner

*Primary Examiner* — Nikita Wells
(74) *Attorney, Agent, or Firm* — Pearl Cohen Zedek Latzer Baratz LLP

(57) ABSTRACT

Some aspects of the invention may be related to an ultraviolet (UV) water disinfection system and a method of assembling such system. The system may be designed to treat, inactivate, disintegrate and/or remove at least two predetermined different types of contaminations. The system may include a chamber to carry the water containing the predetermined types of contaminations. The system may further include one or more first-type UV lamps having a first UV emission spectrum and one or more second-type UV lamps having a second UV emission spectrum different than the first spectrum. A location of the one or more first-type UV lamps and the one or more second-type UV lamps may be determined such that a combined UV impact function matches with a combined sensitivity response function of the two or more predetermined different types of contaminations in the water each having a different response function.

9 Claims, 6 Drawing Sheets

METHOD AND SYSTEM FOR TREATING LIQUIDS BY ULTRAVIOLET ILLUMINATION

CROSS REFERENCE TO RELATED APPLICATIONS

This application claims priority of U.S. Provisional Application No. 61/736,860, filed Dec. 13, 2012, the entire disclosure of which is incorporated herein by reference.

BACKGROUND

Ultraviolet (UV) liquid disinfection or treatment systems, using UV light source have been long known. The irradiation of the liquid inactivates treats and/or removes microorganisms and other types of contaminations in the liquid, if the irradiation intensity and exposure duration are above a minimum dose level. The UV dose may be measured in units of miliJoules per square centimeter delivered by the UV disinfection system to water to ensure disinfection to the required level. Commercial UV disinfection systems are designed to inactivate known microorganisms using a single type of UV lamps that emits UV light in the germicidal spectrum.

Recent regulations regarding the discharging of ballast water in harbors require the inactivation or removal of various sea water contaminations for example, microorganisms and marine species (ballast water are sea water held in a tank within a sea vessel that balances the vessel). For example, regulations were set by the International Maritime Organization (IMO) and the United States Coast Gourd (USCG) together with the US Environmental Production Agency (EPA). Ballast water pumped from the sea in a first ecosystem (a first harbor) may contain marine species typical for that ecosystem. Discharging the water at a second ecosystem (in a second harbor) may harm the marine environment in the second ecosystem introducing new unnatural species to that ecosystem. The new regulations were set to ensure that only a minimal amount of new species either, microorganisms (e.g., bacteria) or larger organisms (e.g., zooplankton) are discharge into the sea.

Water, either sea water, ballast water, brackish water or fresh water, to be treated and/or disinfected may contain several types of contaminations, for example organism, bacteria, microorganism, microbe, germ, virus, organic contaminator and non-organic contaminator. Each type of entity or contamination may be inactivated or removed after exposure to UV light having different spectra. For example, microorganisms such as *Escherichia, coli* and *Vibrio* may be inactivated at the germicidal UV spectrum (e.g., 200-300 nm). The germicidal spectrum is partially in the UVC (100-280 nm) spectrum and partially in the UVB (280-315 nm) spectrum. In yet another example, marine species such as Zooplankton and Phytoplankton may be more sensitive to UV light at the UVC spectrum. Absorption of UV light in organic pollutant such as chloramines and chlorides may cause the oxidation and/or disintegration of the organic pollutant. Each organic compound may have different absorption pick at different part of the UV spectrum. For example, $NH_2Cl$ absorbs UV light having a wavelength of 400, 423 and 414 nm at the UVA spectrum; $NHCl_2$ absorbs UV light having a wavelength of 135, 112 and 110 nm at the UVC spectrum; and $NCl_2$ absorbs UV light having a wavelength of 415, 450 and 462 also at the UVA spectrum.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1A:
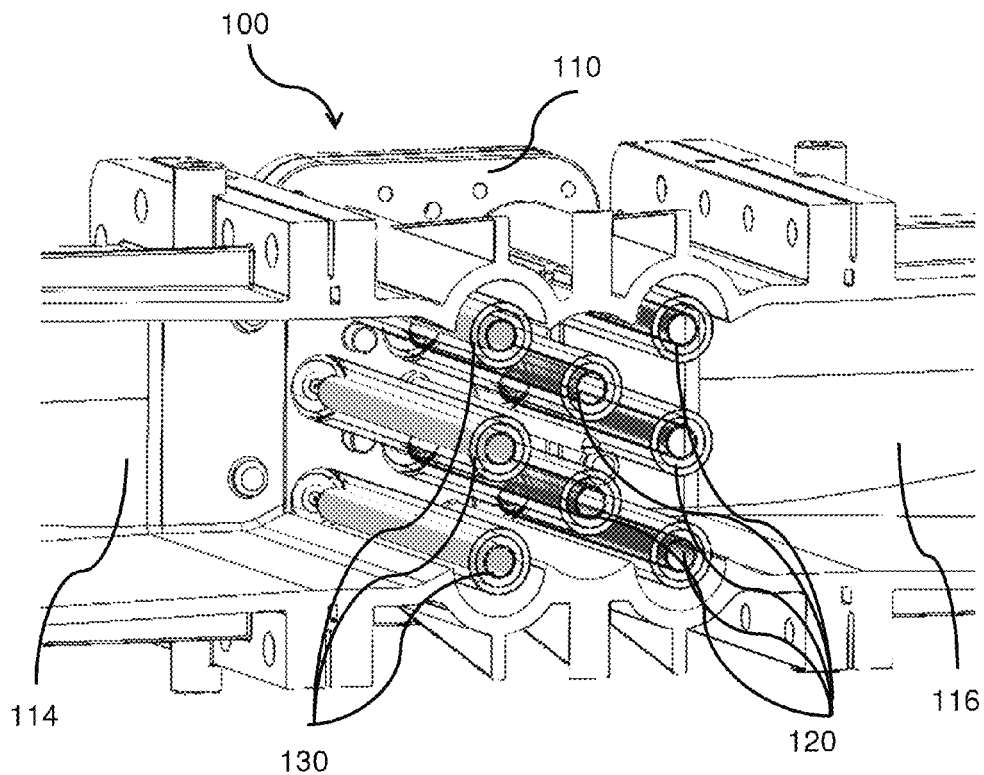
FIG. 1A is a conceptual illustration of an exemplary water treatment system according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention. It can be appreciated that the specific structural and functional details disclosed herein may be representative and do not necessarily limit the scope of the claimed subject matter.

Some embodiments of the invention may include a system for UV water treatment. Such system may include more than one type of UV lamps each having different emission spectra. It will be appreciated that the UV water treatment process according to some embodiments of the invention may include inactivation, disintegration or removal unwanted constituents existing in the liquid such as, for example, organism, bacteria, microorganism, marine species, being, creature, microbe, germ, virus, organic pollutant, non-organic pollutant, oxidizeable toxic or contaminator; any cumulative noxious species of biological or chemical origin; any oxidizing particle, fragment or element, e.g., Hydrogen peroxide or Titanium dioxide, intended to oxidize a contaminator and/or the like. As used herein, throughout the specification and claims, the terns "contaminant", "entity", "substance" refer to any unwanted constituent existing in the liquid that should be inactivated, destroyed, killed, removed or disintegrated by the ultraviolet treatment.

As used herein, microorganisms are a microscopic organisms, which may be a single cell or multicellular organism that can only be detected under microscope. Some microorganisms may be marine species. Each entity or substance (e.g., microorganism, such as *Escherichia coli* and *Vibrio*; marine species such as *Zooplankton* and *Phytoplankton* or organic substances to be disintegrated such as $NH_2Cl$ or $NHCl_2$) may be inactivated, disintegrated or removed using different portion of the UV spectrum, thus a system designed to remove, disintegrate or inactivate two or more of those specific types of entities may include two or more types of UV lamps to emit light at the desired spectrum.

Different types of UV lamps emit UV light at different spectra, for example, around different central wavelengths (e.g., 200, 280, 300, 400 nm). Assembling different types of UV lamps in a single UV disinfection system may allow treating, removing and/or inactivating various types of entities (referred to herein also as contaminants or substances) is a single process. The location of each of the UV lamps may be designed and determined in order to maximize the absorption of the UV light by the different types of contaminations. In designing the location of each UV lamp in a chamber for carrying the water to be disinfected, one may consider the spectrum emitted from each type of UV lamp, the transmittance of the water at that spectrum and each contamination sensitivity response as a function to the UV spectrum. In some embodiments, more than one UV lamp from each type may be included in the system.

Reference is made to FIG. 1A that illustrates an exemplary water disinfection system according to some embodiments of the invention. A system 100 may include a conduit or chamber 110 to carry the water, one or more first-type UV lamps 120 and one or more second-type UV lamps 130. System 100 may be designed to treat, remove or inactivate at least a first-type of substances or contaminants and a second-type of substances or contaminants. Each of the first or second types of substances may be treated by UV light at a different spectrum. Therefore, system 100 may include one or more first-type UV lamps 120 and one or more second-type UV lamps 130 each configured to emit light in the different UV spectrum.

Conduit or chamber 110 may include an inlet 114 to receive the water and an outlet 116 to discharge the water. Chamber 110 may include walls made from any corrosive resisting material. In some embodiments, the walls of chamber 110 may include material that is not corrosion resistant and the walls may be coated with a corrosion resisting coating. In some embodiment, the walls of conduit 110 may, at least partially, include material transparent to UV radiation such as quartz.

First-type UV lamp 120 may generate UV light of a first UV spectrum. For example, first-type UV 120 lamps may emit UV light in the UVB spectrum or the germicidal spectrum. First-type UV lamps 120 may include for example a low-pressure UV lamp, a medium-pressure UV lamp, light emitting diode (LED) UV lamps and/or a microwave-excited UV lamp, as are all known in the art. First-type UV lamps 120 may be immersed in the water flow in conduit 110 (as illustrated) or may be located externally to conduit 110. In the case that first-type UV lamps 120 are located outside conduit 110, the conduit may include a UV transparent window (not illustrated) and UV lamp 120 may be located in proximity to the UV transparent window, such that UV light emitted from UV lamp 120 may enter conduit 110 and illuminate the water flowing in conduit 110.

Figure 1B:
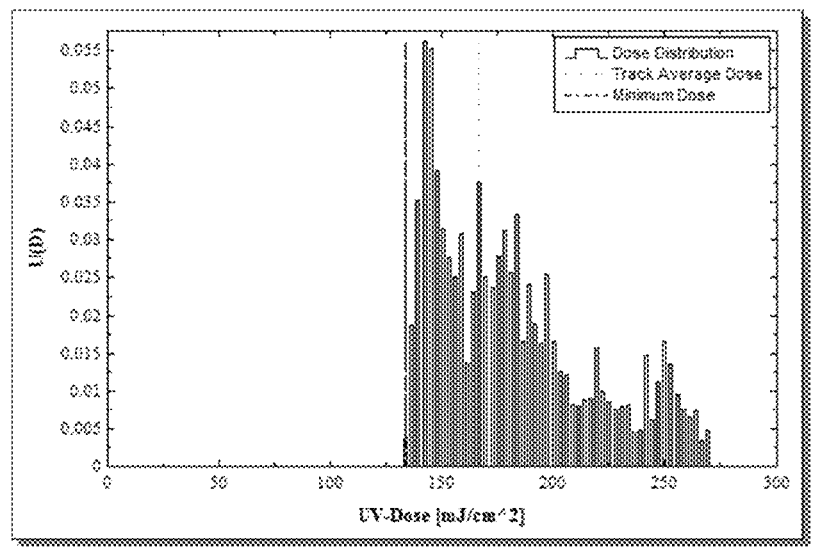
FIG. 1B is a diagram showing dose distribution calculated for the exemplary water treatment system of FIG. 1A according to embodiments of the invention.
Figure 2A:
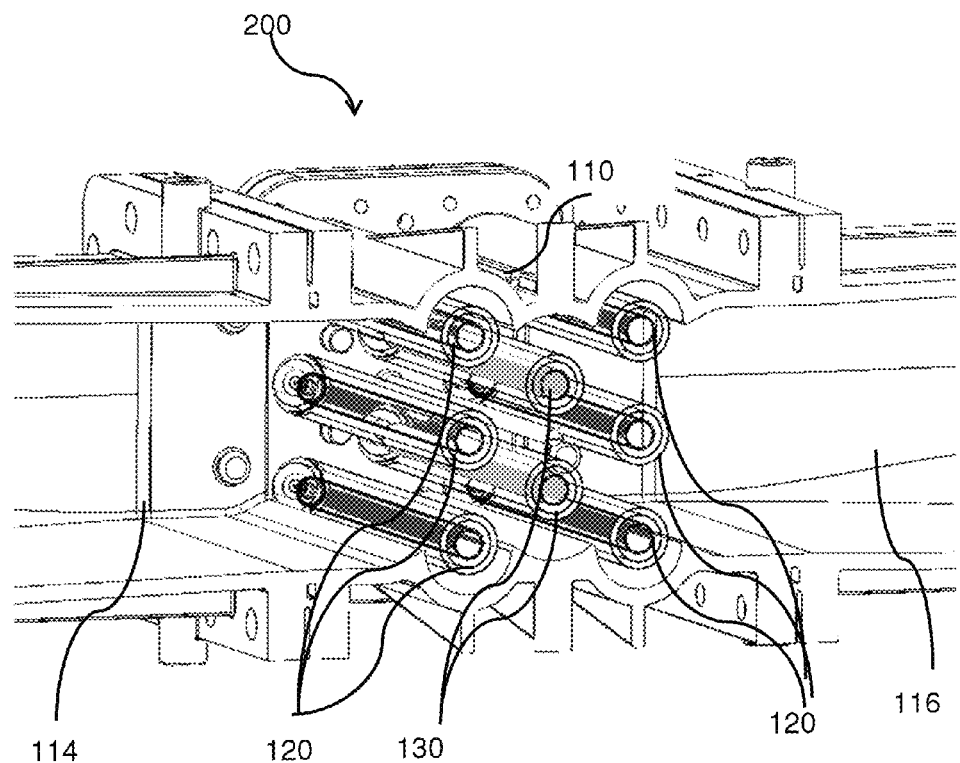
FIG. 2A is a conceptual illustration of another exemplary water treatment system according to some embodiments of the invention.
Figure 2B:
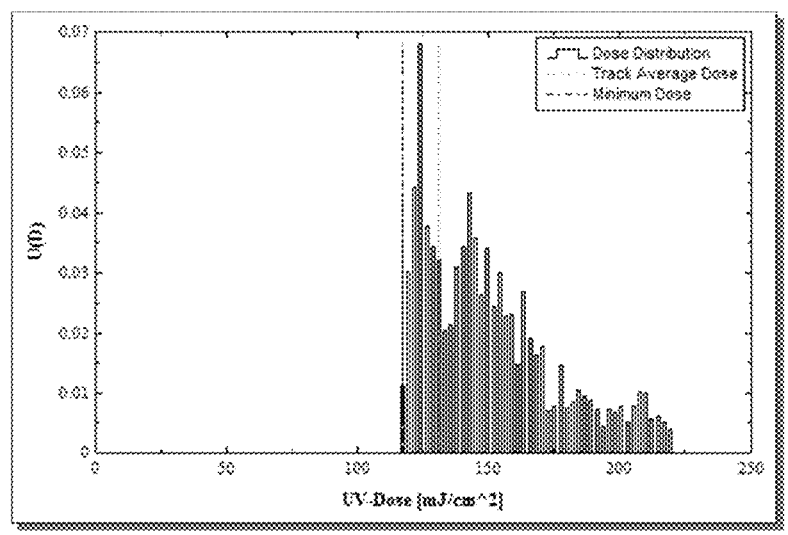
FIG. 2B is a diagram showing dose distribution calculated for the exemplary water treatment system of FIG. 2A according to embodiments of the invention.
Figure 3A:
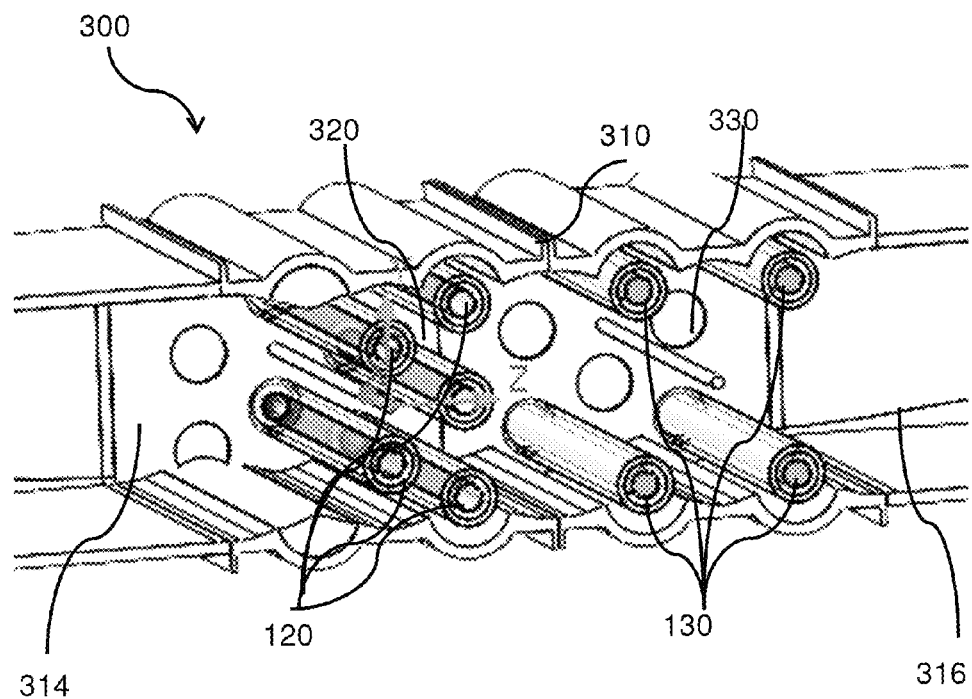
FIG. 3A is a conceptual illustration of yet another exemplary water disinfection treatment according to some embodiments of the invention.
Figure 3B:
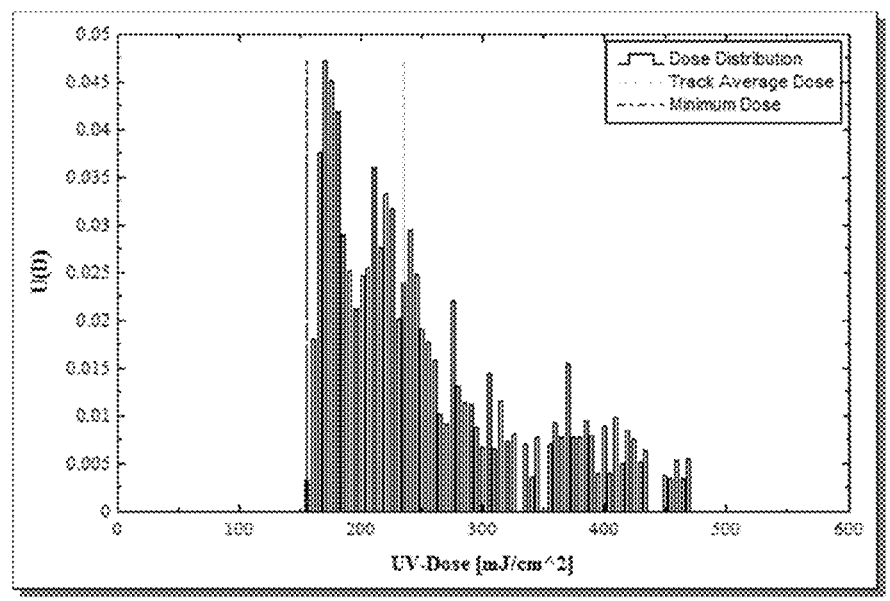
FIG. 3B is a diagram showing dose distribution calculated for the exemplary water treatment system of FIG. 3A according to embodiments of the invention.

Second-type UV lamp 130 may generate UV light of a second UV spectrum different than the first spectrum. For example, second-type UV lamp 130 may emit UV light in the UVC or UVA spectra. Second-type UV lamps 130 may include, for example, a low-pressure UV lamp, a medium-pressure UV lamp, light emitting diode (LED) UV lamps and/or a microwave-excited UV lamp. Second-type UV lamps 130 may be immersed in the water flowing through conduit 110 (as illustrated) or may be located externally to conduit 110. Although two types of UV lamps are illustrated in FIG. 1, it will be understood by those skilled in the art, however, that the embodiments of the claimed subject matter may be practiced with a different number of types of UV lamps, for example, three types of UV lamps may be included in system 100, a first type UV lamp to emit light in the UVB spectrum, a second-type of UV lamp to emit UV light at the UVA spectrum and a third-type of UV lamps to emit UV light in the UVC spectrum.

Figure 4:
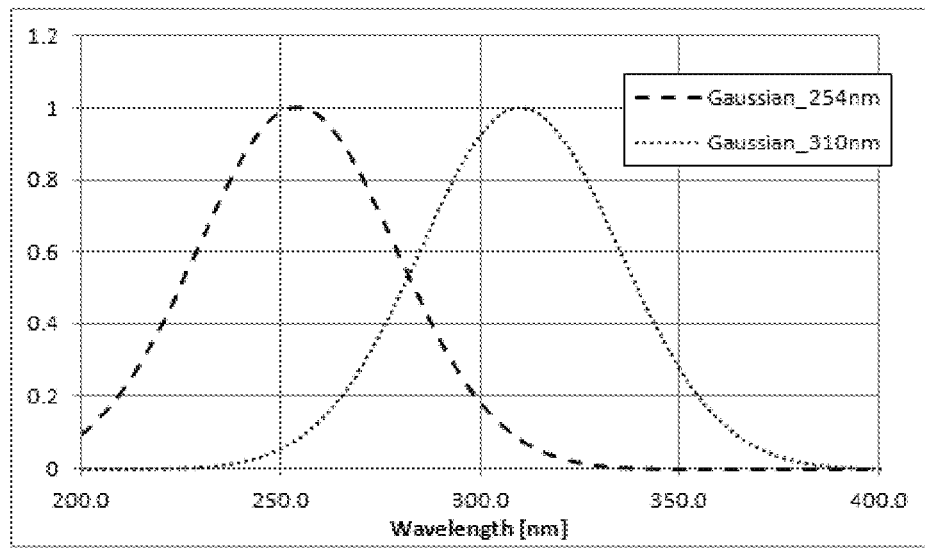
FIG. 4 is a graph presenting a sensitivity response function of two different types of contaminations according to some embodiments of the invention.

First-type UV lamps 120 and second-type UV lamps 130 may be located substantially orthogonal to the water flow in chamber 110 (as illustrated). Each of lamps 120 or 130 may be protected by a UV transparent sleeve. In some embodiments, the location of one or more first-type UV lamps 120 and one or more second-type UV lamps 130 may be determined such that a combined UV spectral impact, from all the UV lamps matches with a combined sensitivity response function of two or more different predetermined types of substances in the water, each having a different response function. For example, the location of the UV lamps may be designed such that the combined UV emission function of the lamps would substantially match the combined sensitivity response function of the substances. Some examples of spectral impact of various medium pressure UV lamps are given in FIGS. 5A-5C and an example for a combined sensitivity response function is given in FIG. 4.

As used herein, sensitivity response function is a curve of the UV absorption efficacy as a function of the wavelength for a specific contaminant. The sensitivity response function shows how efficient is the absorption of UV energy for the specific contaminant at a spectrum of UV wavelengths. A combined sensitivity response function is a curve or curves for two or more different contaminants shown in a single graph. A spectral impact of a lamp indicates the impact of UV light emitted from a specific type of lamp has on a specific type of contamination. The emission spectrum of a specific lamp (e.g., intensity as function of wavelength) is multiplied by the UV sensitivity response function of a specific contaminant to receive the spectral impact of the specific lamps on that contaminant.

Exemplary system 100 may be designed to treat, remove and/or inactivate at least two specific contaminants. For example, system 100 may be designed to inactivate *Coli* (microorganism) and *Phytoplankton* (marine organism). System 100 may include three (3) second-type lamps 130 placed in a front row facing the water flow (from inlet 114) and five (5) first-type UV lamps 120 placed in two rows; two lamps 120 in-between lamps 130 and 3 lamps 120 in a row behind the second row (before outlet 116). In some embodiments, lamps 120 may be Hg-based UV lamps configured to emit UVC germicidal spectrum to treat microorganisms and lamps 130 may be Hg doped Ga—In UV lamps configured to emit UVB spectrum for treating Phytoplankton at far field.

Figure 5A:
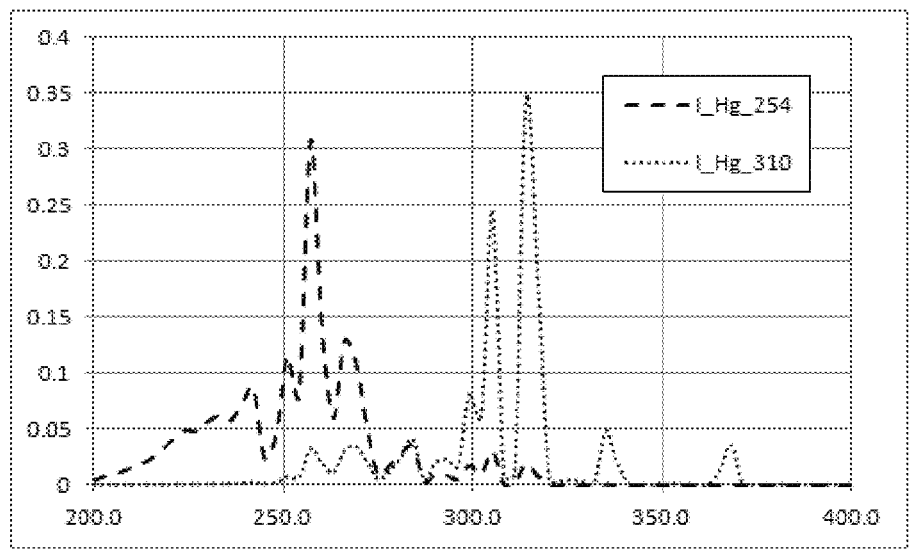
FIGS. 5A-5C are graphs of spectral impact functions of various UV lamps according to some embodiments of the invention.
Figure 5B:
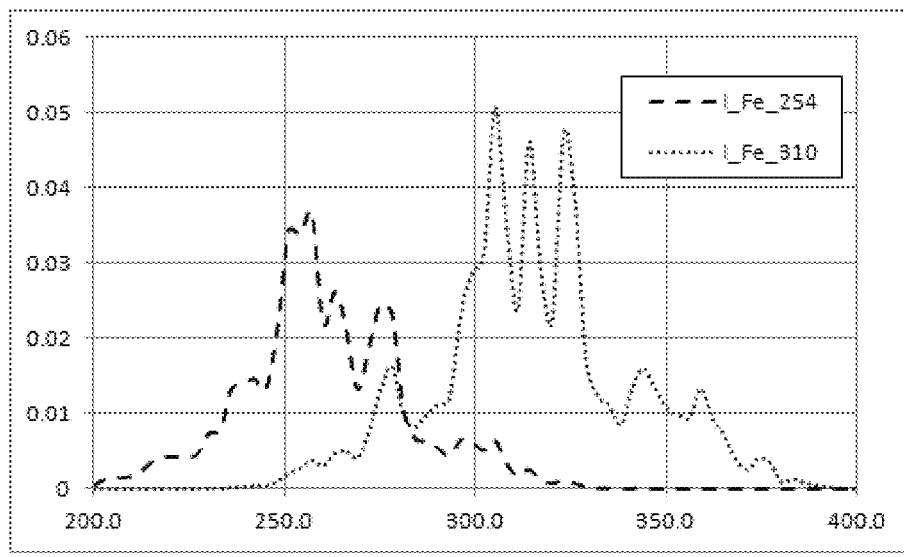
Figure 5C:
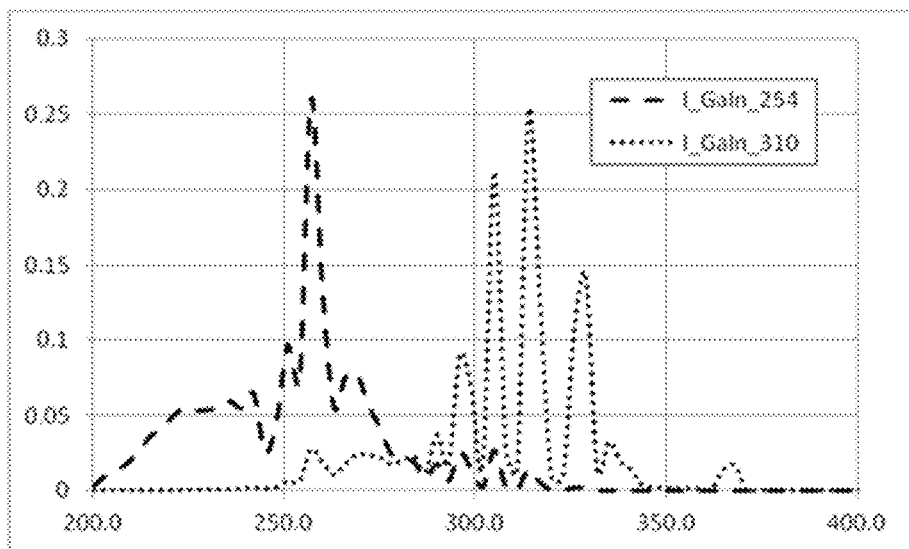

A calculated diagram showing UV dose distribution in system 100 is given in FIG. 1B wherein lamps 120 are medium-pressure Hg based UV lamps and lamps 130 are medium-pressure Hg In—Ga doped UV lamps. The calculations were based on the data presented in FIG. 4 for the first and second types of contaminants and in FIGS. 5A and 5C for the first and second types of the UV lamps. The minimum UV dose level that system 100 may apply to the water is approximately 130 mJ/cm$^2$.

Reference is made to FIG. 2A that illustrates another exemplary water treatment system according to some embodiments of the invention. A system 200 may be designed to treat, remove, disintegrate or inactivate at least a first type of contaminants (first-type substance) and a second-type of contaminants (second type substance). System 200 may include a conduit 110 to carry the water, one or more first-type UV lamps 120 and one or more second-type UV lamps 130. The main difference between system 100 and system 200 may be in the location and number of lamps 120 and 130. In exemplary system 200 six (6) first-type lamps 120 are placed in two rows. A first row having three (3) lamps 120 facing the water flow and a second row having three (3) lamps 120 near outlet 116. Two second-type lamps 130 were placed in between the two rows. Water coming from inlet 114 may face almost simultaneously both the first and second type lamps.

In some embodiments, lamps 120 may be Hg-based UV lamps configured to emit UVC germicidal spectrum to treat microorganisms and lamps 130 may be Ga—In doped Hg UV lamps configured to emit UVB spectrum for treating marine species at far field. A calculated diagram showing the UV dose distribution in system 200 is given in FIG. 2B. The minimum UV dose that system 200 may apply to the water is approximately 120 mJ/cm$^2$, which is lower than the minimum UV dose of 130 mJ/cm$^2$ calculated for system 100. The higher the minimum UV dose level the better the treatment efficiency.

Reference is made to FIG. 3A, which that illustrates another exemplary water disinfection system according to embodiments of the invention. A system 300 may be designed to treat, remove, disintegrate or inactivate at least a two type of entities. System 300 may include a conduit 310 to carry the water, one or more first-type UV lamps 120 and one or more second-type UV lamps 130. Lamps 120 and 130 may be substantially of the same type of system 100. Conduit 310 may be longer than conduit 110 and may occupy a larger number of UV lamps. Two arrays of UV lamps may be located in conduit 310. A first array 320 may include a compact arrangement of five (5) first-type UV lamps 120 and a second array 330 may include a looser array of four (4) second-type lamps 130. Lamps 120 may be Hg-based UV lamps configured to emit UVC germicidal spectrum to treat a first type of contaminant (e.g., *Escherichia*). The UVC has lower wave length and lower penetration depth in the water (lower transmittance) thus may require more compact arrangement of lamps 120 to effectively treat the water. Lamps 130 may be Ga—In doped Hg UV lamps configured to emit UVB spectrum for treating a second type of contaminant (e.g., marine species such as *Zooplankton*). UVB has longer wavelength, thus may have a longer penetration (transmittance) in the water. Therefore, in order to effectively treat the water or inactivate the contaminant a looser array of lamps 130 may be the optimized arrangement.

A calculated diagram showing UV dose distribution in system 300 is given in FIG. 3B. The minimum UV dose that system 300 may apply to the water is approximately 150 mJ/cm$^2$, which is much higher than minimum UV dose calculated for systems 200 and 100 respectively. The location of the first and second types of UV lamps in system 300 may result in a better treatment, removal and/or inactivation of both types of contaminants.

In some embodiments, systems 100, 200 and 300 may be located on a watercraft or a sea vessel traveling between two or more locations (e.g., harbors). The vessels may include ballast tanks for carrying ballast water. Before discharging the ballast water, for example, in order to rebalance the sea vessel, the ballast water may be treated in a system such as systems 100, 200 and 300 to inactivate and remove marine organisms and marine microorganisms that may harm an ecosystem in the water in which the ballast water is to be discharged. Water treated by a system according to some embodiments of the invention may stand in international regulation for discharging ballast water.

In some embodiments, systems 100, 200 and 300 may further include two or more UV detectors (not illustrated). The UV detectors may be any illumination source status detectors that may be used for on-line real-time measurements and calculations of UV light transmittance of the water. The UV light transmittance of the water may be calculated from the measurements of the detectors in terms of Ultraviolet Water Transmission (UVT), commonly used in the UV industry and defined as the UV transmittance of a one centimeter water column at 254 nm.

In some embodiments, systems 100, 200 and 300 may further include a valve or faucet (not illustrated) to control a water flow rate in the conduits. Systems 100, 200 or 300 may further include a flow meter to measure the water flow rate either before or after the valve. The flow meter may be any commercial flow meter that is configured to measure a flow of water in a pipe or a conduit. In some embodiments, UV lamps 120 and 130, the UVT detectors, the flow meter and/or the valve may be coupled to a controller (not illustrated) configured to receive data and measurements from the UVT detector and the flow meter and adjust various working parameters of system, for example, the intensity of the UV lamps (e.g., the power applied to the lamps) and/or the water flow rate (e.g., by controlling the valve).

Reference is made to FIG. 4, showing a theoretical graph of a combined sensitivity response function of two different types of hypothetical substances, each having a Gaussian-like sensitivity response function. The horizontal axis corresponds to the wavelength in nm and the vertical axis to the efficiency of the absorbance of the UV light. The sensitivity response function of the first-type substance is illustrated with a dashed line and has maximum absorbance of UV light at a wavelength of 254 nm in the UVC spectrum. The sensitivity response function of the second-type substance is illustrated with a dotted line and has maximum absorbance of UV light at a wavelength of 310 nm in the UVB spectrum. UV water treatment systems that may be designed to treat the two contaminants may include a first type of UV lamp that emits UV light having at least some of the emissions picks in the spectral impact function at 254 nm and a second type of UV lamp that emits UV light having at least some of the emissions picks at 310 nm Reference is made to FIGS. 5A-5C that shows graphs of combined spectral impact functions of various UV lamps according to some embodiments of the invention. The spectral impact of three types of medium pressure UV lamps were calculated based on the emission spectrum of each lamp type multiplied by the combined sensitivity response function of the two different types of the hypothetical contaminants, shown in FIG. 4. The horizontal axis corresponds to the wavelength in nanometers and the vertical axis to the efficiency of the absorbance of the UV light. FIG. 5A shows spectral impact functions of Hg-based UV lamp; FIG. 5B shows spectral impact functions of Hg Fe doped UV lamp; and FIG. 5C shows spectral impact functions of Hg In—Ga doped UV lamp. The dashed lines are the impact functions related to the first-type contamination having absorption pick at 254 nm (in the UVC rang) and the dotted lines are the impact functions related to the second-type contamination having absorption pick at 310 nm (in the UVB rang). When comparing the three Figs. one may conclude that the better UV lamp type to treat the first type of contamination is the Hg based UV lamp and the better lamp type is to treat the second-type contamination is the Hg In—Ga doped UV lamp. The selected first and second type lamps were used is designing systems 100, 200 and 300 and for calculating the location of each lamp in the system and the calculation of the UV doses.

Figure 6:
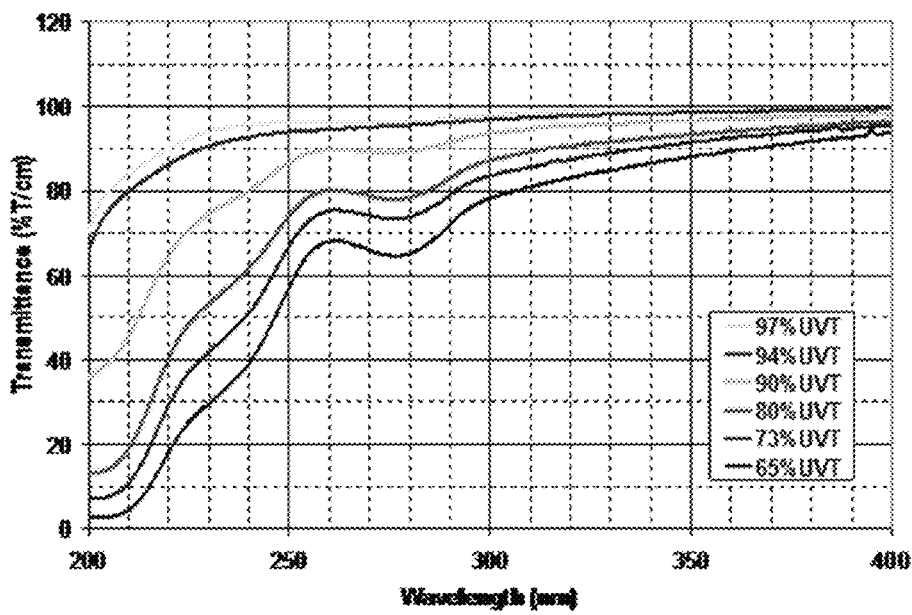
FIG. 6 presents water spectral transmittance curves according to some embodiments of the invention.

Reference is made to FIG. 6 that shows water spectral transmittance curves according to some embodiments of the invention. The horizontal axis corresponds to the wavelength and the vertical axis to the transmittance percentage per cm. The various curves serve as an example to different spectral transmittance of different water types from different sources. It can be noticed that the higher the wavelength for every curve the better is the transmittance. UVA light has higher penetration depth in water than UVB and UVC light and UVB has better transmittance than UVC. Therefore, locating UVC lamps may require more compact packing of the lamps, where the lamps may be located in short distance from each other while locating UVB lamps and further UVA lamps may allow locating the lamps in the chamber at greater distances from one another. The distance between the lamps may be determined based on a transmittance graph, for example, the graphs in FIG. 6.

Figure 7:
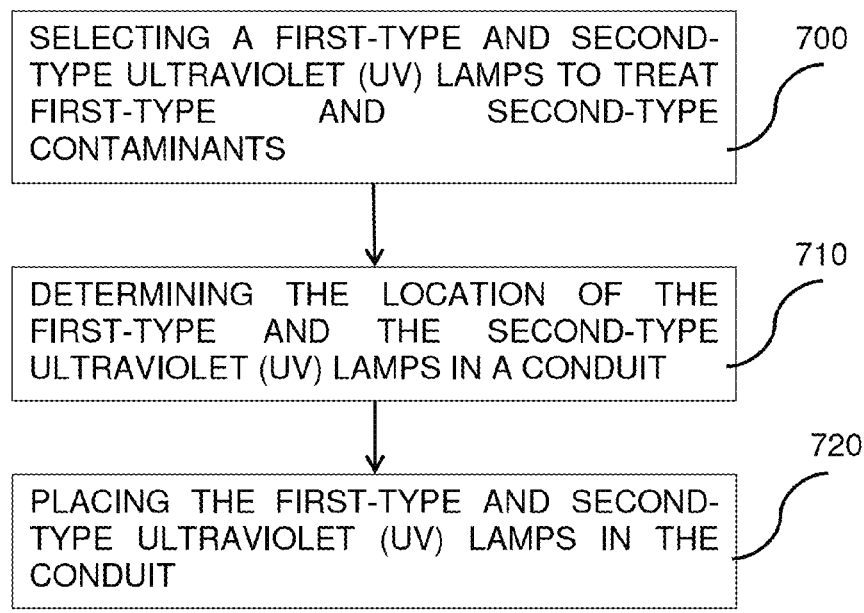
FIG. 7 is a flowchart of a method of designing a UV water treatment system according to some embodiments of the invention.

Reference is made to FIG. 7 which is a flowchart of a method of designing a water treating system according to some embodiments of the invention. The water treatment system may be designed to treat water and inactivate, remove or disintegrate two of more specific substances (contaminants). In operation 700, the method may include selecting a first-type and a second type of UV lamps for treating a first-type and second type contaminant. In some embodiments, the UV treatment system may be designed to treat, remove and/or inactivate a predetermined first-type substance (e.g., microorganisms such as *Coli*) and a predetermined second type substance (e.g., organic compound such as $NHCl_2$). Each of the contaminants may absorb UV light at a different spectrum. For example, *Coli* may be inactivated by applying UV light at the UVB spectrum and $NHCl_2$ may be removed by applying UV light at the UVA spectrum. Determining the location of each lamp may be based on the combined sensitivity response function of the substances, the first and second emission spectra of the lamps, the degree of expected transmittance of the water, expected flow parameters, and physical parameters of the conduit.

In some embodiments, the types of the UV lamp may be selected by combining the combined sensitivity response function and emissions spectra of various types of UV lamps and determining which type of lamp may better treat the first or second types of known contaminants. In some embodiments, the system may be designed to treat three or more types of contaminants and the combined sensitivity response function may include all the various types of contaminants that the system may treat. In such additional types of UV lamps may be required to cover the entire UV spectrum needed to treat the different types of contaminants. In other embodiments, additional lamps emitting at wavelengths outside the UV spectrum may be added.

In operation 710, the method may include determining the location of one or more first-type ultraviolet (UV) lamps (e.g., lamps 120) having a first UV emission spectrum and one or more second-type UV lamps (e.g., lamps 130) having a second UV emission spectrum different than the first spectrum in conduit that is designed to carry the water. The design of the locations is based on computerized simulations and is aimed to match a combined UV impact function from all the UV lamps to the combined sensitivity response function of the specific contaminants or substances. In some embodiments, the location of each lamp from the first and the second type is determined such that a combined UV impact function from all the UV lamps substantially matches with a combined sensitivity response function of predetermined two or more different types of substances in the water each having a different response function, for example, the combined sensitivity response function illustrated in FIG. 4.

In some embodiments, the UV spectrum emitted from each of the selected UV lamps may be analyzed from known data with respect to the transparency of the water to be treated. The transparency of the water may be predetermined based on known data regarding various types of water (e.g., sea water, ballast water, brackish water, fresh water or the like). The number and location of each type of lamp may be determined based on the transmittance, such that the longer the wavelength the larger is the penetration depth of the light and the larger may be the distance between two adjacent lamps from the same type, for example, as disclosed with respect to lamps 120 and 130 of system 300.

In some embodiments, a computerized optimization calculation may be made (e.g., by a processor) in order to determine the best location and the number of lamps for each type of lamps. One goal of the optimization calculation is to receive the highest possible minimal UV dose level that is applied to the water, to gain the most from the UV power applied to the water.

In operation 720, the method may include placing the one or more first-type UV lamps and one or more second-type UV lamps in the determined location. Placing of first-type and second-type UV lamps may be done during the assembling of the UV treatment system. The assembling of the system may include assembling additional components.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An ultraviolet (UV) water treatment system comprising:
a conduit to carry water to be treated;
one or more first-type UV lamps having a first UV emission spectrum; and
one or more second-type UV lamps having a second UV emission spectrum different than the first spectrum; wherein location of the one or more first-type UV lamps and the one or more second-type UV lamps is determined such that a combined UV spectral impact of the first-type UV lamps and the second-type UV lamps is matched to a combined UV sensitivity response function of two or more predetermined different types of substances in the water, each of the different types of substances having a different UV sensitivity response function.

2. The system of claim 1, wherein the first UV emission spectrum in a UVB range between around 280 nm and around 315 nm.

3. The system of claim 1, wherein the emission spectrum of the second type of UV lamps is substantially in a UVC range between around 100 nm and around 280 nm.

4. The system of claim 1, wherein system is configured to inactivate both microorganisms and *Zooplankton* or *Phytoplankton* in a single treatment process in the conduit.

5. The system of claim 1, wherein the system is configured to decompose an organic pollutant and inactivate microorganisms to a desired absolute microbial level in a single process the conduit.

6. The system of claim 1, wherein system is configured to inactivate both at least one of *Escherichia Coli* and *Vibrio* and at least on of *Zooplankton* and *Phytoplankton* in a single treatment process in the conduit.

7. The system of claim 1, wherein the system is configured to receive water to be treated from a ballast tank.

8. A computer-implemented method comprising:
determining the location of one or more first-type ultraviolet (UV) lamps having a first UV emission spectrum and one or more second-type UV lamps having a second UV emission spectrum different than the first spectrum in a UV water treatment system,
wherein determining the location is such that a combined UV spectral impact matches with a combined UV sensitivity response function of predetermined two or more different types of contaminants in the water each having a different response function.

9. The method of claim 8, wherein determining is based on the combined UV sensitivity response function, the first and second emission spectra and the transmittance of the water in the first and second spectra.

\* \* \* \* \*